US011428122B1

United States Patent
Lefebvre et al.

(10) Patent No.: US 11,428,122 B1
(45) Date of Patent: Aug. 30, 2022

(54) THERMAL PROTECTION FOR A GAS TURBINE ENGINE PROBE

(71) Applicant: PRATT & WHITNEY CANADA CORP., Longueuil (CA)

(72) Inventors: Guy Lefebvre, St-Bruno-de-Montarville (CA); Herve Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/209,631

(22) Filed: Mar. 23, 2021

(51) Int. Cl.
*F01D 25/14* (2006.01)
*F02C 7/24* (2006.01)
*F01D 21/00* (2006.01)

(52) U.S. Cl.
CPC ......... *F01D 25/145* (2013.01); *F01D 21/003* (2013.01); *F01D 25/14* (2013.01); *F02C 7/24* (2013.01); *F05D 2220/32* (2013.01); *F05D 2250/75* (2013.01); *F05D 2260/231* (2013.01); *F05D 2260/80* (2013.01)

(58) Field of Classification Search
CPC ........ F01D 17/02; F01D 17/08; F01D 17/085; F01D 21/003; F01D 25/14; F01D 25/145; F05D 2260/80; F05D 2260/231; F02C 7/24

See application file for complete search history.

(56) References Cited

U.S. PATENT DOCUMENTS

| 4,597,675 | A | * | 7/1986 | Maertins | G01K 13/02 |
| | | | | | 702/50 |
| 6,037,581 | A | * | 3/2000 | Zorner | G01B 11/14 |
| | | | | | 73/660 |
| 7,913,661 | B2 | | 3/2011 | Krempasky et al. | |
| 9,551,281 | B2 | * | 1/2017 | Lefebvre | F01D 17/24 |
| 9,631,517 | B2 | * | 4/2017 | Liles | F02C 7/20 |
| 9,880,059 | B2 | * | 1/2018 | Myers | G01K 13/02 |
| 9,897,009 | B2 | | 2/2018 | Strong et al. | |
| 10,876,426 | B2 | * | 12/2020 | Smith | F01D 17/085 |
| 2007/0256404 | A1 | * | 11/2007 | Lefebvre | F02C 7/22 |
| | | | | | 60/39.091 |
| 2012/0247108 | A1 | * | 10/2012 | Romig | F01D 21/003 |
| | | | | | 60/722 |
| 2016/0123732 | A1 | * | 5/2016 | Marocchini | G01M 15/14 |
| | | | | | 33/1 PT |
| 2020/0040749 | A1 | * | 2/2020 | Holleran | F01D 25/28 |
| 2020/0088606 | A1 | * | 3/2020 | Warren | F02C 7/00 |
| 2020/0300810 | A1 | * | 9/2020 | Liu | G01R 33/1223 |

* cited by examiner

*Primary Examiner* — Topaz L. Elliott
(74) *Attorney, Agent, or Firm* — Norton Rose Fulbright Canada LLP

(57) ABSTRACT

A thermal shielding arrangement for a turbine probe comprises a heat shield having first and second mating portions axially engaged in overlapping relationship around a probe extending through an air cavity between an exhaust case and a turbine housing. The first mating portion is provided on a radially outer surface of the turbine housing. The second mating portion projects radially inwardly from a radially inner surface of the exhaust case.

20 Claims, 6 Drawing Sheets

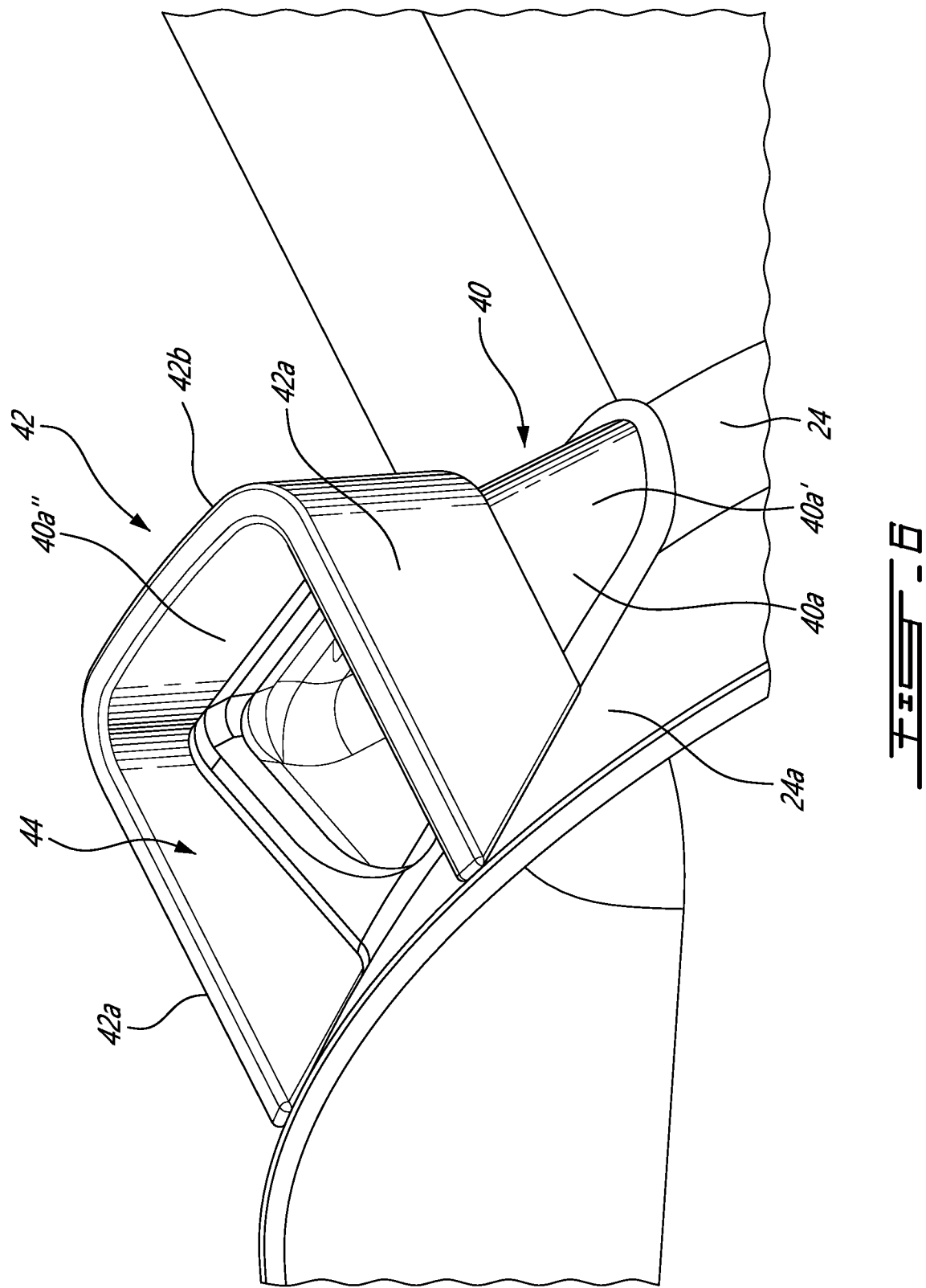

THERMAL PROTECTION FOR A GAS TURBINE ENGINE PROBE

TECHNICAL FIELD

The application relates generally to gas turbine engines and, more particularly, to a thermal protection for a probe disposed in a hot section of a gas turbine engine.

BACKGROUND OF THE ART

A gas turbine engine includes sections at low temperatures, namely cold section modules, and sections at high temperatures, namely hot section modules. The cold section modules include for example the compressor, while the hot section modules include for example, the combustor and the turbine. While some mechanical components may sustain the high temperatures prevailing in the hot section modules, probes may not sustain these high temperatures, and their functioning could be altered by the hot ambient gases present in hot section modules.

SUMMARY

In one aspect, there is provided a gas turbine engine exhaust arrangement comprising: a probe, a turbine housing extending around a central axis and having a first probe boss configured to receive the probe; an exhaust case surrounding the turbine housing and having a second probe boss aligned with the first probe boss on the turbine housing, the probe extending through the first and second probe bosses, an air cavity between the turbine housing and the exhaust case; and a probe heat shield having first and second mating portions axially slidably fitted one over the other around the probe in the air cavity, the first mating portion provided on a radially outer surface of the turbine housing, the second mating portion projecting radially inwardly from the exhaust case.

In another aspect, there is provided a thermal shielding arrangement for a turbine probe extending through an exhaust case and a turbine housing of a gas turbine engine having an axis, the thermal shielding arrangement comprising: a heat shield having first and second mating portions axially engaged in overlapping relationship around the probe in an air cavity between the exhaust case and the turbine housing, the first mating portion provided on a radially outer surface of the turbine housing, the second mating portion projecting radially inwardly from a radially inner surface of the exhaust case.

In a further aspect, there is provided a gas turbine engine comprising: a compressor mounted for rotation about an axis; a turbine drivingly connected to the compressor, the turbine received in a turbine housing having a first probe boss; an exhaust case for discharging combustion gases received from the turbine, the exhaust case surrounding the turbine housing and having a second probe boss aligned with the first probe boss; a turbine probe extending through the first and second probe bosses and into the turbine housing; and a probe heat shield including first and second mating portions axially engageable around the turbine probe in an air cavity between the turbine housing and the exhaust case, the first mating portion provided on a radially outer surface of the turbine housing, the second mating portion provided on a radially inner surface of the exhaust case.

In a still further aspect, there is provided an exhaust case for a gas turbine engine, the exhaust case comprising: an outer wall extending circumferentially around an axis; a probe boss on the outer wall, the probe boss defining a passage for receiving a turbine probe, the probe boss having an inner end portion projecting into the exhaust case; and a U-shaped probe heat shield mounted to a radially inner surface of the outer wall and oriented to offer an axially open end for allowing axial engagement of the U-shaped probe heat shield over a corresponding mating structure of the gas turbine engine, the inner portion of the probe boss surrounded by the U-shaped heat shield probe.

DESCRIPTION OF THE DRAWINGS

Reference is now made to the accompanying figures in which:

FIG. 6 is a top isometric view illustrating the engagement of the exhaust case portion of the probe heat shield over the mating portion on the power turbine housing, the exhaust case being omitted for clarity.

DETAILED DESCRIPTION

Figure 1:
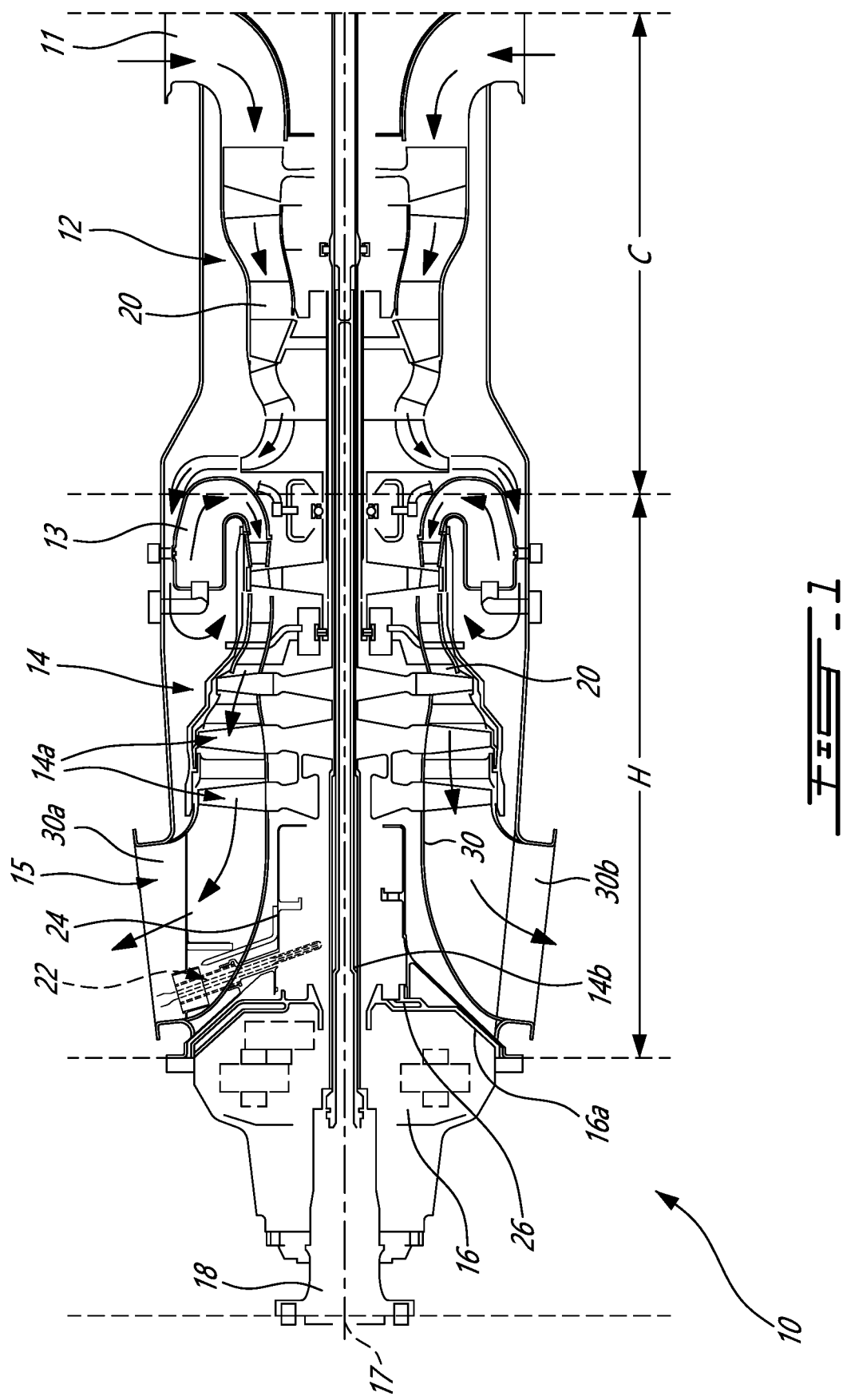
FIG. 1 is a schematic longitudinal/axial cross-section view of a boosted reverse flow gas turbine engine having a thermally shielded turbine probe.

FIG. 1 illustrates a gas turbine engine 10 of a type preferably provided for use in subsonic flight, generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust case 15 through which the combustion gases exit the engine 10. The turbine 14 includes a low pressure (LP) or power turbine 14a drivingly connected to an input end of a fully enclosed reduction gearbox RGB 16. The RGB 16 has an output end drivingly connected to an output shaft 18 configured to drive a rotatable load (not shown). The rotatable load can, for instance, take the form of a propeller or a rotor, such as a helicopter main rotor. The gas turbine engine 10 has an engine centerline 17. According to the illustrated embodiment, the compressor and the turbine rotors are mounted in-line for rotation about the engine centerline 17.

The gas turbine engine 10 has an axially extending central core which defines an annular gaspath 20 through which gases flow, as depicted by flow arrows in FIG. 1. The exemplary embodiment shown in FIG. 1 is a "reverse-flow" engine because gases flow through the gaspath 20 from the air inlet 11 at a rear portion thereof, to the exhaust case 15 at a front portion thereof. According to one aspect, the engine 10 can have an engine architecture corresponding to that of the engine described in applicant's U.S. Pat. No. 10,393,027 issued on Aug. 27, 2019, the entire content of which is herein incorporated by reference.

As shown in FIG. 1, according to some embodiments, the exhaust case 15 comprises an asymmetric dual port exhaust duct 30 for exhausting combustion gases received from the last stage of the LP turbine 14a on opposed sides of the engine 10. The dual port exhaust duct 30 is qualified as "asymmetric" because the two exhaust ports thereof are not coaxial to the engine centerline 17 (i.e. the exhaust flow discharged from the exhaust duct is not axial, it is rather discharged in a direction that diverges from the engine centerline 17). According to at least some embodiments, the dual port exhaust duct 30 has a generally "Y-shaped" annular body including an annular central inlet conduit portion extending axially around the engine centerline 17 for receiving the annular flow of combustions gases discharged from the last stage of LP turbine 14a, and first and second diverging outlet conduit portions 30b, 30c branching off laterally from the central inlet conduit portion. According to some embodiments, the first and second outlet conduit portions 30b, 30c are identical.

Figure 5:
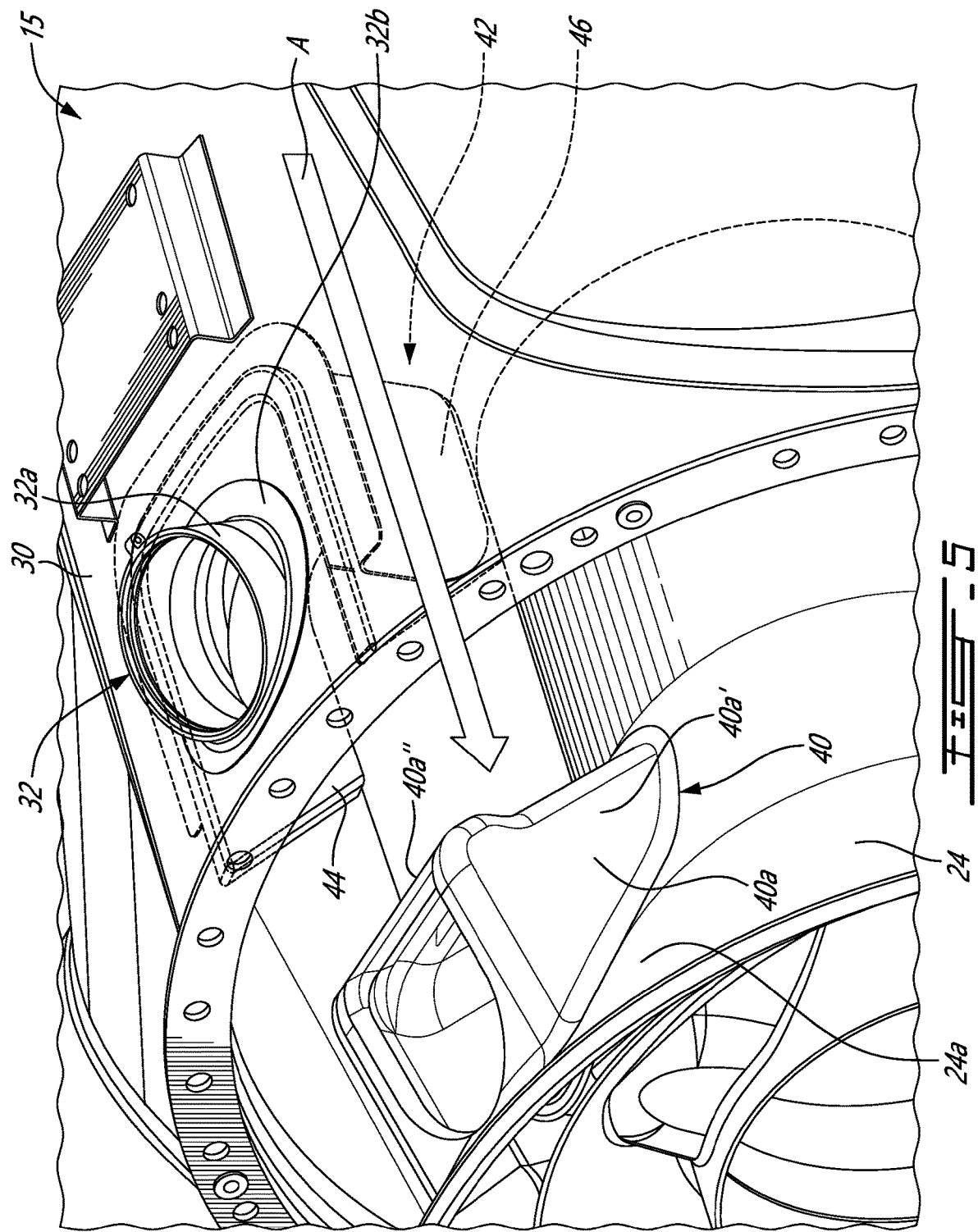
FIG. 5 is an isometric view illustrating a sequence of the assembly of the exhaust case over the power turbine housing, the U-shaped portion of the heat shield on the exhaust case aligned with the mating portion on the power turbine housing for axial engagement thereover.

Referring jointly to FIGS. 1 and 5, it can be seen that the turbine 14 comprises a power or LP turbine housing 24 mounted to and extending axially from the RGB 16 centrally into the hollow center of the annular exhaust duct 30. The LP turbine housing 24 is configured to receive a bearing (not shown) for supporting the LP turbine rotor(s). As can be appreciated from FIG. 5, during assembly, the exhaust duct 30 is axially slid in position over the LP turbine housing 24. Once the exhaust duct 30 has been properly positioned over the LP turbine housing 24, the two are detachably secured to the RGB such as by bolting at a front flange interface.

Referring back to FIG. 1, it can be seen that the engine 10 has a cold section C that is under a "relatively" cold ambient temperature. The cold section C includes the air inlet 11 and the compressor 12. The engine 10 also has a hot section H, which in use, is subject to high temperatures. The hot section H includes the combustor 13, the turbine 14 and the exhaust case 15. For instance, the temperatures inside the turbine 14 are typically in excess of 1000 degree. C. In use, the continuous flow of gas to which a turbine 14 is exposed can be at a temperature up to 1700 degree. C.

Figure 2:
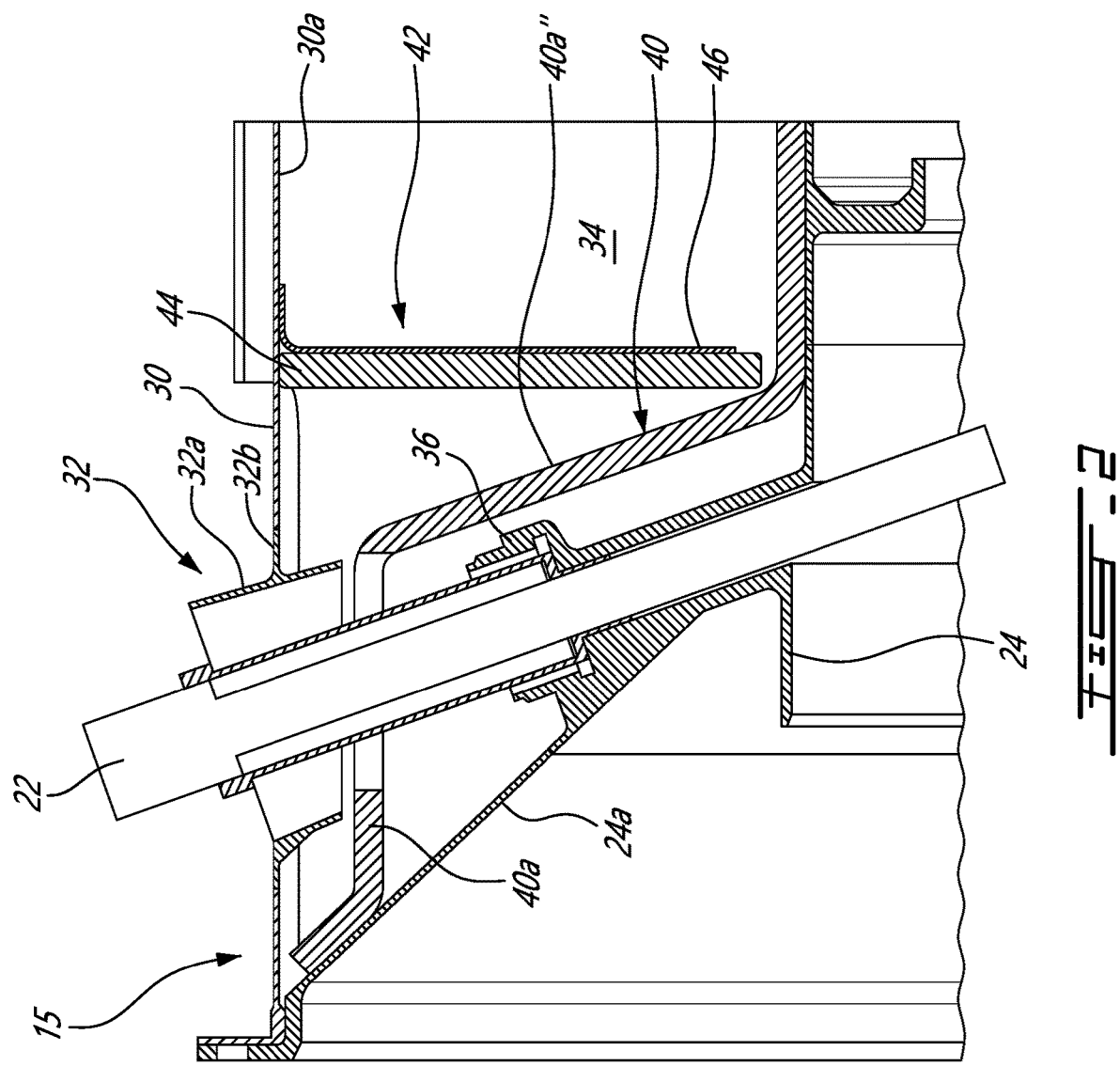
FIG. 2 is an enlarged axial cross-section view illustrating a probe heat shield assembly formed around a turbine probe in an air cavity between an exhaust case and a power turbine housing of the engine shown in FIG. 1.

The engine 10 is equipped with a plurality of probes (sensors) for measuring various operating parameters, such as torque, speed, distance, temperature, pressure etc. Some of these probes are disposed in the hot section H of the engine 10. Accordingly, these probes need to be able to cope with the high temperatures prevailing in the hot section H of the engine 10. It may thus be necessary to thermally shield the probes in order to maintain the temperature of the probes within acceptable limits. FIGS. 1 and 2 illustrate an example of such a thermally shielded probe. More particularly, FIGS. 1 and 2 illustrate a probe 22 projecting through the exhaust duct and the LP turbine housing 24 to a location where a tip of the probe 22 is positioned adjacent to the LP turbine shaft for measuring an operating parameter (e.g. speed and/or torque) of the LP turbine 14a.

The exemplary probe 22 extends through a probe boss 32 mounted in a receiving hole defined at the top dead center of the exhaust duct 30 between the two diverging outlet conduit portions 30b, 30c thereof. The term "boss" is herein intended to generally refer to a mounting feature on a work piece. For instance, it can take the form of a protruding feature used to locate one component (e.g. a probe) within a pocket or hole of another component (e.g. the exhaust duct). As exemplified in FIGS. 2-4, the probe boss 32 may be provided in the form of a casting including a sleeve 32a and an outer flange 32b welded or otherwise suitably secured to the exhaust duct 30. According to some embodiments, the sleeve 32a has a slanted tubular portion that projects inwardly into the exhaust duct 30 in a "dead" air cavity 34 (FIG. 2) radially between the LP turbine housing 24 the exhaust duct 30. The slanted tubular portion is aligned with an associated probe boss 36 provided on the turbine housing 24. The probes bosses 32, 36 provide a passage for the probe 22 through the exhaust case 15 and the turbine housing 24. As shown in FIG. 2, the probe 22 extends through the registering probe bosses 32, 36 and into the LP turbine housing 24 next to the LP turbine shaft. The tip portion of the probe 22 is thermally shielded by the oil contained in the LP turbine housing 24. However, the upper portion of the probe 22 in the cavity 34 radially between the exhaust duct 30 and the turbine housing 24 does not benefit from the heat shielding action of the oil in the turbine housing 24. Accordingly, a probe heat shield is provided in the cavity 34 to protect the upper portion of the probe 22 from heat radiations emanating from the exhaust duct 30. As will be seen herein after, the probe heat shield may be configured to create a heat shielding volume of air or air gap around the turbine probe 22 along a full radial extent of the cavity 34 between the exhaust duct 30 and the LP turbine housing 24 while allowing for the assembly of the exhaust duct 30 over the LP turbine housing 24 as shown in FIG. 5.

According to some embodiments, the probe heat shield includes a first mating portion 40 pre-assembled on the turbine housing 24 and a second mating portion 42 pre-assembled on the exhaust duct 30. As will be seen hereafter, the first and second mating portions 40, 42 of the probe heat shield are configured to axially fit one over the other around the probe 22. It will also be seen that the first and second mating portions 40, 42 are configured to allow for a blind assembly of the heat shield in the cavity 40 between the exhaust duct 30 and the LP turbine housing 24.

As shown in FIGS. 2, 5 and 6, the first mating portion 40 of the heat shield can include a thermal blanket 40a mounted to a radially outer surface the LP turbine housing 24 around the LP turbine housing probe boss 36 (also herein referred to as the first probe boss). The thermal blanket 40a can include a thermal insulation core (e.g. high temperature insulation fiber/wool materials) encapsulated in a metallic skin (e.g. sheet metal or metallic foil). As can be appreciated from FIGS. 2 and 5, the thermal blanket 40a on the power turbine housing 24 can be mounted to the LP turbine housing 24 so as to form a protective enclosure around a first portion of the length the probe 22 projecting radially outwardly from the LP turbine probe boss 36. However, as shown in FIG. 2, the protective enclosure formed by the thermal blanket 40a on the LP turbine housing 24 only radially extends along a portion of the cavity 34. Indeed, the radially outer end of the thermal blanket 40a through which the probe 22 extends is spaced radially inwardly from the inner end of the probe boss 32 (also herein referred to as the second probe boss) on the exhaust duct 30 so as to permit axial assembly of the exhaust duct 30 over the LP turbine housing 24. The portion of the probe 22 projecting radially outwardly from the turbine housing thermal blanket 40a is thermally shielded by the second mating portion 42 of the heat shield, that is the portion of the heat shield projecting radially inwardly from the exhaust duct 30.

As best shown in FIGS. 2-5, the second mating portion 42 of the heat shield is configured to be axially engaged over the thermal blanket 40a on the turbine housing 24 and to extend radially outwardly therefrom to close the radial gap between the inner end of the probe boss 32 and the radially outer end of the thermal blanket 40a on the turbine housing 24. The first and second mating portions 40, 42 of the heat shield cooperate to shield the probe 22 along all the radial height of the cavity 34 from the turbine housing 24 to the exhaust duct 30. In this way, the portion of the length of the probe 22 extending through the cavity 34 can be fully capped with thermally insulating material while allowing for a blind assembly of the heat shield mating portions 40, 42 of the exhaust duct 30 and the turbine housing 24. That is the first and second mating portions 40, 42 of the probe heat shield cooperate to surround the probe 22 radially across a full extent of the cavity 34. As be appreciated from FIGS. 2, 3 and 6, the first and second mating portions 40, 42 of the heat shield have a radial overlap to account for thermal growth differential between the LP turbine housing 24 and the exhaust duct 30. Accordingly, in operation, the first and second mating portions 40, 42 of the probe heat shield can move relative to one another as a result of different thermal expansions between the exhaust duct 30 and the LP turbine housing 24 and yet still ensure the integrity of the insulation compartment they jointly form around the probe 22 in the cavity 34. The radial overlap is selected so that no radial gap is created between the first and second mating portions 40, 42 of the probe heat shield during engine operations.

Figure 3:
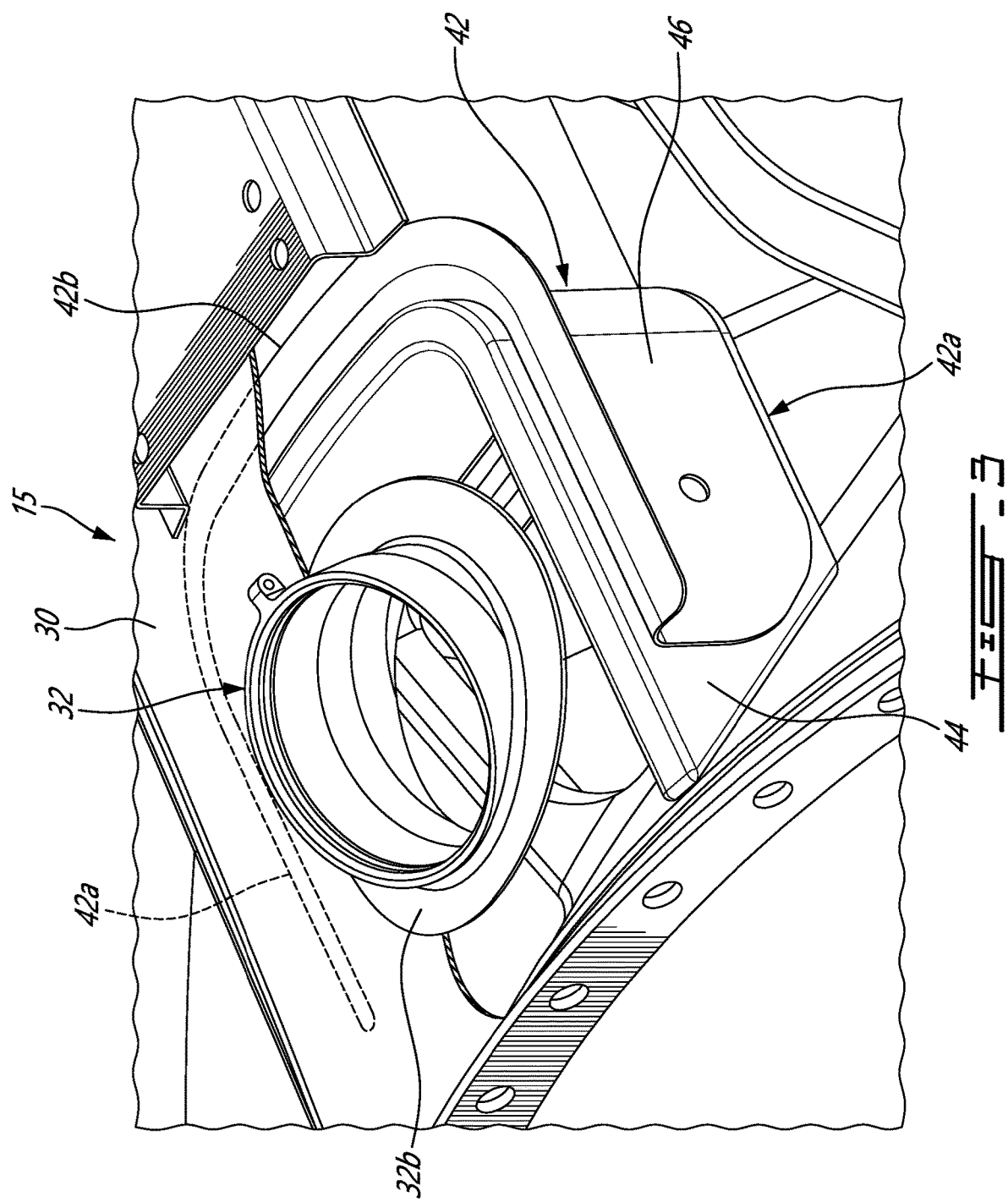
FIG. 3 is an enlarged isometric view of a portion of the exhaust case partly broken away to reveal a portion of the probe heat shield assembly including a U-shaped support bracket mounted to a radially inner surface of the exhaust case and lined with a thermal blanket for axial engagement over a mating heat shield portion on an outer surface of the power turbine housing.
Figure 4:
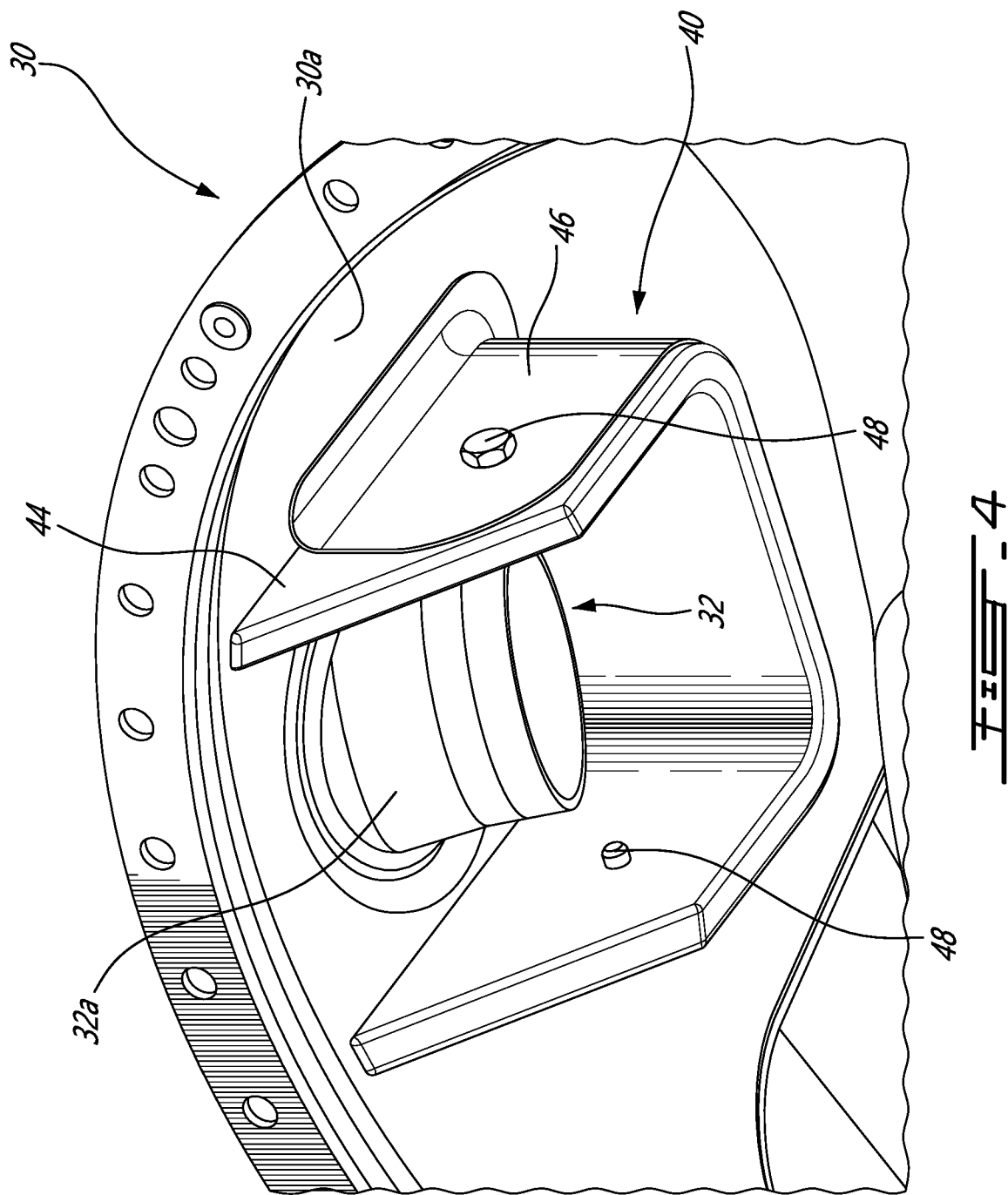
FIG. 4 is a front isometric view of the exhaust case illustrating the support bracket and the thermal blanket around exhaust probe boss.

As best shown in FIGS. 3 and 4, the second portion 42 of the heat shield on the exhaust duct 30 has a generally U-shaped body including a pair of side arms 42a extending axially from an axially facing bridge portion 42b to an axially open end facing the mating portion 40 of the LP turbine housing 24 (the U-shaped body is opens towards the RGB 16 in the embodiment illustrated in FIG. 1). The radially inner end portion of the probe boss 32 is received between the side arms 42a. It can be appreciated from FIGS. 2 and 4, that the U-shaped body extends radially inwardly beyond the inner end of the probe boss 32 (i.e. the second portion 42 of the heat shield projects deeper into the cavity 34 than the probe boss 32) for engagement over the first mating portion 40 of the heat shield. The side arms 42a of the second mating portion 42 also project axially forward of the inner end of the probe boss 32 and are configured for uniform axial abutment against the corresponding slope surface 24a (FIGS. 2, 5 and 6) on the RGB side of the LP turbine housing 24. The side-arms 42a are spaced so that the inner surface thereof fit in a sealing fashion over the corresponding sides 40a' (FIGS. 5 and 6) of the thermal blanket 40a on the LP turbine housing 24. The axial extent of the side arms 42a is selected so that the bridge portion 42b of the U-shape body abuts axially firmly against the corresponding axially facing surface 40a'' of the LP turbine housing thermal blanket 40a when the distal end surfaces of the side arms 42a axially abut against the front slope surface 24a of the LP turbine housing 24. The U-shape body of the second mating portion 42 of the heat shield is sized and shaped to provide a tight fit engagement of the second mating portion 42 over the first mating portion 40 of the heat shield and, thus, provides a proper sealing interface between the first and second mating portions 40, 42 of the heat shield. As shown in FIG. 5, the heat shield is assembled by angularly aligning the first and second mating portions 40, 42 and then axially fitting the exhaust duct 30 over the LP turbine housing 24 as depicted by arrow A. The angular alignment of the mating portions 40, 42 can be facilitated by pre-assembling the first and second mating portions 40, 42 of the heat shield at the top dead center of the LP turbine housing 24 and exhaust duct 30, respectively. Dead center visual indicators (not shown) can be provided on the exhaust duct 30 and the LP turbine housing 24 to further facilitate alignment.

According to some embodiments, the second portion 42 of the heat shield comprises a thermal blanket 44 having a construction similar to that of the thermal blanket 40a used on the LP turbine housing 24 but structurally backed or reinforced by a support bracket 46 mounted to a radially inner surface 30a of the exhaust duct 30. The support bracket 46 can be made of sheet metal and is suitably attached to the exhaust duct 30, such as by welding, brazing or riveting. The thermal blanket 44 can be detachably mounted inside the support bracket 46 by any suitable means. According to the illustrated embodiment, fasteners, such as bolts 48 (FIG. 4), are used to detachably attach the thermal blanket 44 to its support bracket 46. Still according to the illustrated embodiment, both the support bracket 46 and the thermal blanket 44 have a U-shape configuration and cooperate to form the U-shaped body of the second mating portion 42 of the probe heat shield. Indeed, it can be appreciated from FIGS. 3 and 4 that the support bracket 46 has a U-shape body with an inner surface lined with a corresponding U-shaped thermal blanket 44. As shown in FIG. 4, the thermal blanket 44 projects axially and radially beyond the outlines of the U-shape backing bracket 46 to provide a suitable interface with the thermal blanket 40a of the first mating portion 40 of the probe heat shield. It is the thermal blanket 44 that engages the thermal blanket 40a on the LP turbine housing 24. While the exemplified support bracket 46 shown in the drawings is near to being coextensive to the thermal blanket 44, it is understood that the size of the bracket could be reduced as long as it still provide sufficient backing surface for the thermal blanket 44 to retain its shape for proper engagement with the mating portion 40 of the probe heat shield on the LP turbine housing 24.

It can be appreciated that at least some of the embodiments allow to create a heat shield around a turbine probe 22 at assembly in a blind area for the assembler. According to one aspect, a protective volume of air is created around the probe 22 by axial engagement of the heat shield mating portions 40, 42, which are pre-assembled on the turbine housing 24 and the exhaust duct 30. In this way, the protective volume of air can be automatically created by the assembly of the exhaust duct 30 over the turbine housing 24. The protective volume of air circumscribed by the mating portions 40, 42 of the so formed heat shield is in fluid communication with a cooler volume of air outside the exhaust case 15. For instance, the volume of air around the probe 22 can be in fluid communication with an air gap between the engine outer case and a surrounding nacelle (not shown). The volume of air around the probe 22 can be fluidly connected to this external cooler volume of air via the probe boss 32 on the exhaust case 15.

The above description is meant to be exemplary only, and one skilled in the art will recognize that changes may be made to the embodiments described without departing from the scope of the invention disclosed. For instance, while the probe installation has been described in the context of a turboprop/turboshaft engine architecture, it is understood that it could be applied to other engines, including turbofan and auxiliary power unit (APU) engines. Also, while the exemplified probe is installed on the power turbine housing, it is understood that it could be installed on other structures of the hot section of the gas turbine engine. Also, it is understood that the present disclosure is not limited to speed or torque probes. Other modifications which fall within the scope of the present invention will be apparent to those skilled in the art, in light of a review of this disclosure, and such modifications are intended to fall within the appended claims.

The invention claimed is:

1. A gas turbine engine exhaust arrangement comprising:
   a probe;
   a turbine housing extending around a central axis and having a first probe boss;
   an exhaust case surrounding the turbine housing and having a second probe boss aligned with the first probe boss, the probe extending through the first probe boss and the second probe boss;
   a cavity radially between the turbine housing and the exhaust case; and
   a probe heat shield having a first and a second mating portion axially slidably fitted one over the other around the probe in the cavity, the first mating portion provided on a radially outer surface of the turbine housing, the second mating portion projecting radially inwardly from the exhaust case into the cavity.

2. The gas turbine engine exhaust arrangement according to claim 1, wherein the second mating portion of the probe heat shield has a U-shaped body having a pair of axially extending arms, the first mating portion of the probe heat shield axially received between the axially extending arms of the U-shaped body.

3. The gas turbine engine exhaust arrangement according to claim 2, wherein the second probe boss projects radially inwardly from the exhaust case into the cavity, and wherein the U-shaped body surrounds the second probe boss in the cavity.

4. The gas turbine engine exhaust arrangement according to claim 3, wherein the U-shaped body projects radially inwardly into the cavity to a location beyond an inner end of the second probe boss to define a radial overlap with the first mating portion of the probe heat shield on the turbine housing.

5. The gas turbine engine exhaust arrangement according to claim 2, wherein the U-shaped body comprises a thermal blanket structurally backed with a support bracket mounted to a radially inner surface of the exhaust case.

6. The gas turbine engine exhaust arrangement according to claim 5, wherein the thermal blanket is removably mounted inside the support bracket.

7. The gas turbine engine exhaust arrangement according to claim 5, wherein the support bracket extends over a major portion of a surface area of the thermal blanket.

8. The gas turbine engine exhaust arrangement according to claim 1, wherein the first and second mating portions of the heat shield define an air volume around the probe, the air volume in fluid communication with a source of air outside the exhaust case.

9. The gas turbine engine exhaust arrangement according to claim 1, wherein the exhaust case comprises an asymmetric dual exhaust duct having first and second outlet portions diverging from the central axis for discharging combustion gases, and wherein the second probe boss is disposed between the first and second outlet portions.

10. The gas turbine engine exhaust arrangement according to claim 9, wherein the second probe boss and the second mating portion of the probe heat shield are located at a top dead center of the asymmetric dual exhaust duct.

11. A thermal shielding arrangement for a turbine probe extending through an exhaust case and a turbine housing of a gas turbine engine having an axis, the thermal shielding arrangement comprising: a heat shield having first and second mating portions axially engageable in overlapping relationship around the probe when the probe is mounted in an air cavity between the exhaust case and the turbine housing, the first mating portion provided on a radially outer surface of the turbine housing, the second mating portion projecting radially inwardly from a radially inner surface of the exhaust case.

12. The thermal shielding arrangement according to claim 11, wherein the second mating portion comprises a support bracket projecting from the radially inner surface of the exhaust case and having an inner surface lined with a thermal blanket.

13. The thermal shielding arrangement according to claim 12, wherein the support bracket and the thermal blanket have a U-shape configuration with an axially open end for receiving the first mating portion of the heat shield.

14. The thermal shielding arrangement according to claim 12, wherein the thermal blanket comprises a thermal insulation core surrounded by a metallic skin, the thermal blanket detachably mounted to the support bracket.

15. The thermal shielding arrangement according to claim 11 wherein the first and second mating portions cooperate to form an air gap around the turbine probe, the air gap in fluid communication with a source of air outside the exhaust case.

16. A gas turbine engine comprising:
   a compressor having a compressor rotor mounted for rotation about an axis;
   a turbine having a turbine rotor drivingly connected to the compressor rotor, the turbine rotor supported by a bearing received in a turbine housing having a first probe boss;
   an exhaust case for discharging combustion gases received from the turbine, the exhaust case surrounding the turbine housing and having a second probe boss aligned with the first probe boss;
   a turbine probe extending through the first and second probe bosses and into the turbine housing; and
   a probe heat shield including first and second mating portions axially engageable around the turbine probe in an air cavity between the turbine housing and the exhaust case, the first mating portion provided on a radially outer surface of the turbine housing, the second mating portion provided on a radially inner surface of the exhaust case.

17. The gas turbine engine according to claim 16, wherein the second mating portion comprises a support bracket projecting radially inwardly from the radially inner surface of the exhaust case, the support bracket having an inner surface lined with a thermal blanket.

18. The gas turbine engine according to claim 17, wherein the support bracket has a U-shaped body and is disposed to surround the second probe boss inside the exhaust case.

19. The gas turbine engine according to claim 18, wherein the U-shaped body is oriented so as to define an axially open end in a direction towards the first mating portion of the probe heat shield.

20. The gas turbine engine according to claim 16 wherein the second mating portion axially and radially extends over the first mating portion.

* * * * *